United States Patent [19]

Harrison, III et al.

[11] Patent Number: 5,694,568
[45] Date of Patent: Dec. 2, 1997

[54] PREFETCH SYSTEM APPLICABLE TO COMPLEX MEMORY ACCESS SCHEMES

[75] Inventors: Williams Ludwell Harrison, III, Brookline, Mass.; Sharad Mehrotra, Champaign, Ill.

[73] Assignee: Board of Trustees of the University of Illinois, Urbana, Ill.

[21] Appl. No.: 508,290

[22] Filed: Jul. 27, 1995

[51] Int. Cl.⁶ ............................................. G06F 12/08
[52] U.S. Cl. ............... 395/421.03; 395/464; 395/421.11; 395/421.1
[58] Field of Search .................. 395/414, 421.03, 395/464, 700, 375

[56] References Cited

U.S. PATENT DOCUMENTS

| | | | |
|---|---|---|---|
| 4,807,110 | 2/1989 | Pomerene et al. | 364/200 |
| 4,918,600 | 4/1990 | Harper, III et al. | 364/200 |
| 5,146,570 | 9/1992 | Hester et al. | 395/375 |
| 5,237,666 | 8/1993 | Suzuki et al. | 395/375 |
| 5,247,645 | 9/1993 | Mirza et al. | 395/425 |
| 5,276,826 | 1/1994 | Rau et al. | 394/400 |
| 5,278,963 | 1/1994 | Hattersley et al. | 395/400 |
| 5,285,527 | 2/1994 | Crick et al. | 395/425 |
| 5,287,487 | 2/1994 | Priem et al. | 395/414 |
| 5,291,582 | 3/1994 | Drako et al. | 395/425 |
| 5,305,389 | 4/1994 | Palmer | 395/464 |
| 5,313,634 | 5/1994 | Eickemeyer | 395/700 |
| 5,317,718 | 5/1994 | Jouppi | 395/425 |
| 5,323,489 | 6/1994 | Bird | 395/425 |
| 5,333,291 | 7/1994 | Grunbok et al. | 395/425 |
| 5,357,618 | 10/1994 | Mirza et al. | 395/421.03 |
| 5,361,391 | 11/1994 | Westberg | 395/425 |
| 5,367,656 | 11/1994 | Ryan | 395/421.03 |
| 5,371,870 | 12/1994 | Goodwin et al. | 395/425 |
| 5,390,318 | 2/1995 | Ramakrishnan et al. | 395/485 |
| 5,522,053 | 5/1996 | Yoshida et al. | 395/421.03 |
| 5,537,573 | 7/1996 | Ware et al. | 395/464 |

*Primary Examiner*—Eddie P. Chan
*Assistant Examiner*—Gary J. Portka
*Attorney, Agent, or Firm*—Greer, Burns & Crain, Ltd.

[57] ABSTRACT

A computer processor which speculatively issues prefetch addresses for indirect as well as linear memory traversals after entering an armed state. A particular embodiment of the invention includes a central processing unit connected to an external memory through an interface. A cache memory, preferably integrated onto a processor chip with the central processing unit, is connected to both the central processing unit and the interface. A prefetch device is also preferably integrated onto the chip and selectively issues prefetch addresses after entering an armed state induced by recognized patterns in memory operand addresses of load instructions executed by the central processing unit. The prefetch device includes a recurrence recognition unit and a prefetch unit. When either the linear or indirect armed states are entered, the recurrence recognition unit will direct the prefetch unit to issue prefetch addresses according to a calculated linear or indirect stride. Linear memory traversals may be predicted according to the linear stride, while indirect memory traversals may be predicted according to the indirect stride.

5 Claims, 9 Drawing Sheets

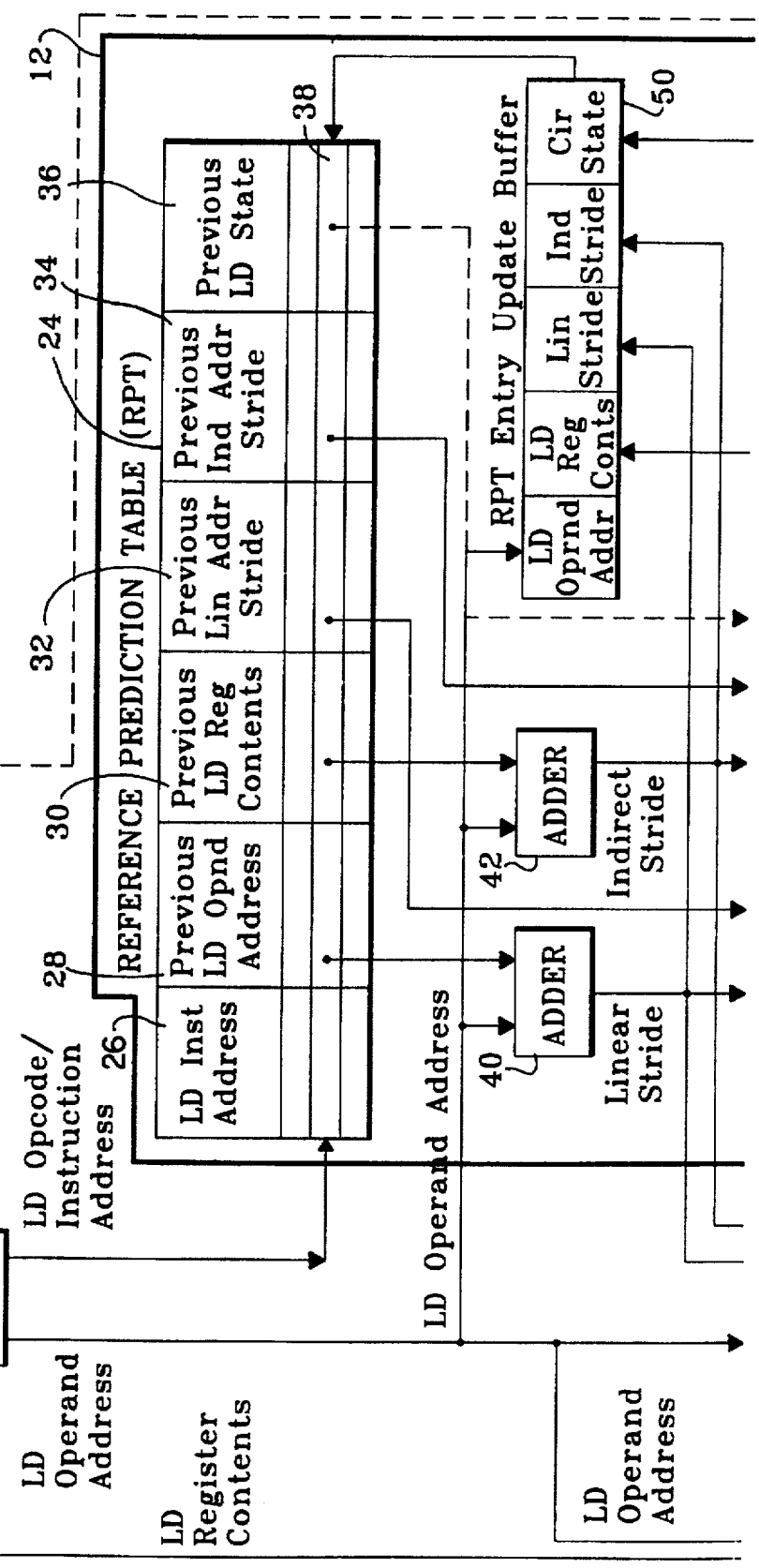

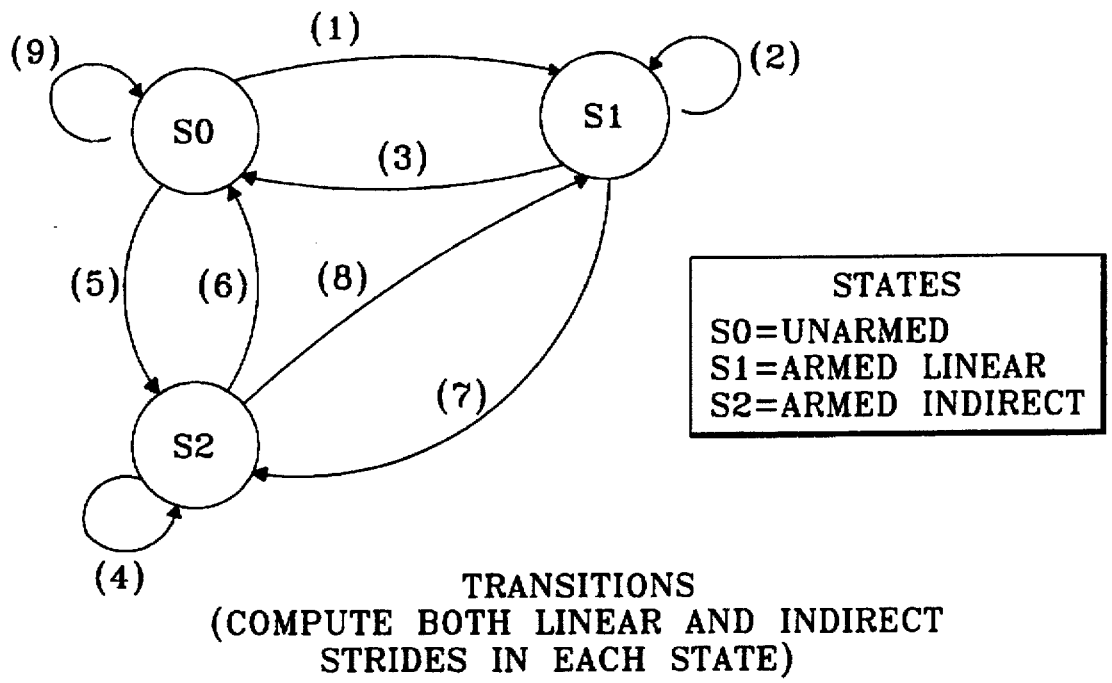

STATES
S0=UNARMED
S1=ARMED LINEAR
S2=ARMED INDIRECT

TRANSITIONS
(COMPUTE BOTH LINEAR AND INDIRECT
STRIDES IN EACH STATE)

STATE S0
(1) IF NEW LINEAR STRIDE==PREVIOUS, AND LINEAR STRIDE !=0, GO TO S1. ENABLE PU
(5) IF NEW INDIRECT STRIDE==PREVIOUS, AND LINEAR STRIDE !=PREVIOUS LINEAR STRIDE, AND LINEAR STRIDE !=0, AND LOAD CONTENTS !=0, GO TO S2. ENABLE PU.
(9) IF NO TRANSITION TO S1 OR S2, STAY IN S0.

STATE S1
(2) IF NEW LINEAR STRIDE==PREVIOUS, AND LINEAR STRIDE !=0, STAY IN S1.
(7) IF NEW INDIRECT STRIDE==PREVIOUS, AND LINEAR STRIDE !=PREVIOUS LINEAR STRIDE, AND LINEAR STRIDE !=0, AND LOAD CONTENTS !=0, GO TO S2.
(3) IF NO TRANSITION TO S1 OR S2, DISABLE PU AND RETURN TO S0.

STATE S2
(4) IF NEW INDIRECT STRIDE==PREVIOUS, AND LINEAR STRIDE !=PREVIOUS LINEAR STRIDE, AND LINEAR STRIDE !=0, AND LOAD CONTENTS !=0, STAY IN S2.
(8) IF NEW LINEAR STRIDE==PREVIOUS, AND LINEAR STRIDE !=0, GO TO S1.
(6) IF NO TRANSITION TO S1 OR S2, DISABLE PU AND RETURN TO S0.

FIG. 3

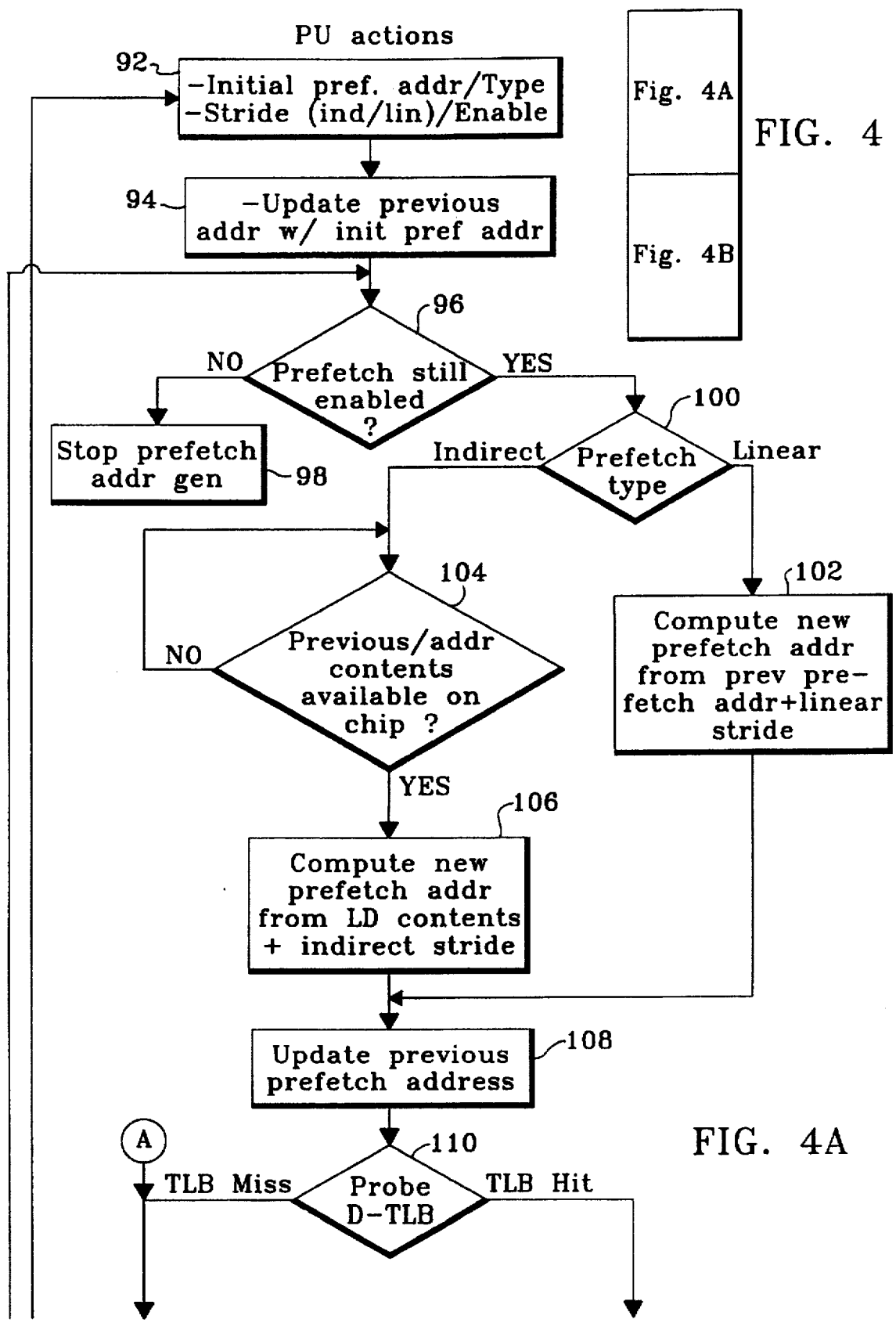

PREFETCH SYSTEM APPLICABLE TO COMPLEX MEMORY ACCESS SCHEMES

The present invention relates generally to an efficient prefetch system which is effective in a processing unit which is executing a complex scheme of memory fetches. More specifically, the present invention concerns a prefetch system utilizing a recurrence recognition unit and a prefetch unit. Prefetch issue is enabled upon an arming of the prefetch unit by the recurrence recognition unit to provide an adaptable and low miss penalty prefetch system.

BACKGROUND OF THE INVENTION

A computer system generally includes one or more central processing units (CPU), main memory and an input-output (I/O) system. In such a system, information needed-by the CPU is obtained through accessing the main memory via a memory interface. The I/O system is used to communicate with devices such as disk drives, keyboards, monitors, etc. Such systems also use a small high speed cache integrated onto the CPU having a much faster access time than main memory. Main memory can be constructed using static or dynamic random access memory (RAM) chips. Static RAM generally has a faster access time than dynamic RAM. Dynamic RAM, while slower, is usually less expensive and more dense than static RAM, thus allowing more memory capacity in smaller chip space. To conserve expense most computer system main memories are built using dynamic RAM. Cache memories, in contrast, are built using static RAM, but are limited in size because of CPU cycle time constraints and expense.

Prior to execution, a computer program is typically stored on an I/O device known as a hard disk. Hard disks have much greater storage capacity and are far cheaper than RAM. However, their access times are several orders of magnitude larger than RAM. Consequently, it is impractical to execute a program efficiently while it resides on a hard disk. Efficiency is highest when the CPU references portions of a program or data that are resident within the caches, since access time is much faster than even main memory access time.

Power-up of a typical computer system results in a load of an operating system program into main memory from the hard disk. MS DOS®, from MICROSOFT® is an exemplary operating system program. The operating system is responsible for managing all the resources of the computer system (the CPU, main memory, and I/O devices), and executing user programs to perform functions such as word processing. When a user program is to be executed, it is transferred into main memory from the hard disk. The operating system typically sets a register in the CPU known as the program counter to point to the address of the program in main memory, and transfers control to the user program. While executing the program, the CPU repeatedly performs the following actions: fetching an instruction and its associated data from main memory, decoding the instruction to determine the operation to be performed, completing the operation, updating any required registers in the CPU register file, and storing any generated data back into memory. A register file serves as a high speed scratch pad memory for holding temporary data generated during computation. After an instruction has been processed, the program counter is updated to either point to the next instruction in memory, or in the event that the previous instruction was a branch that was taken, to the instruction in memory at the destination address of the branch. Upon completion of the user program or an error that causes its termination, the operating system regains control of the computer system.

The number of unique memory addresses that can be generated by a CPU defines its virtual address space. For a 32-bit CPU (whose registers are 32 bits wide) this number is 4 billion ($4 \times 10^9$). A 64-bit CPU can generate over 18 quadrillion ($18 \times 10^{12}$) unique memory addresses. In principle, a program can reference all of the CPU's virtual address space. With current technology however, it is economically and physically infeasible to build main memories that are more than a few gigabytes in size. In fact, in most computers, main memories are typically half a gigabyte (500 megabytes) or smaller. Due to this limitation upon main memory size, a technique known as virtual memory is often used in most computer systems. In a virtual memory system, the operating system and the computer hardware cooperate to provide user programs with the illusion that they are executing in a machine that has a main memory that is equal to the CPU's virtual address space. Virtual memory implementations can be quite complex, but in general principle all allow addressing as if the main memory was a single memory having a size equal to the CPU's virtual address space.

A typical virtual address scheme partitions the computer's main memory into fixed size regions known as pages. Likewise, a program residing on the hard disk can be said to consist of a number of pages. When the program first starts execution, a small number of its pages are loaded into main memory by the operating system. A set of tables, known as page tables, are maintained by the operating system in main memory to record the location of these pages. During the execution of a program, the CPU generates addresses in its virtual address space. The page tables are used to translate these virtual addresses into physical addresses, which correspond to the actual location of the program instructions and data in main memory. As a program continues to execute, it needs access to instructions and data that are not contained in pages resident in main memory. A page fault is then said to occur, and the operating system is requested to bring in the missing page. A page fault is an expensive operation that takes a long time to execute, so for efficient program execution it is desirable to achieve low page fault rates. Due to the principle of locality, at any instant in the execution of a program, a certain number of pages generally suffice to capture almost all of the program's instruction and data references. This is known as the program's working set. If an adequate number of main memory pages are available to hold a program's working set, the page fault rate quickly drops to negligible levels.

If several programs are concurrently in execution in a computer system, the main memory may contain pages belonging to various programs. Thus, if a page fault occurs, it is necessary to evict a memory resident page, and write it back to disk if it has been modified. To accelerate the virtual-to-physical address translation, a cache, known as the translation lookaside buffer (TLB), is provided inside the CPU to hold a program's most recent page table references. Translations that hit in the TLB can proceed without referencing the page tables in main memory, which provides a significant performance increase. Those that miss in the TLB proceed to reference the page tables, and the TLB is updated thereafter. The TLB is also crucial to the performance of prefetch schemes.

In much the same way that a hard disk is too slow to be the primary storage means for a program during execution, the wide, speed difference between main memory and the CPU makes main memory too slow to efficiently provide operands to the CPU and receive the results of every instruction. Caches have been very effective in bridging this gap. Like virtual memory, cache operation is based, in part, upon the principle of locality. The principle of locality has two aspects: temporal and spatial. Temporal locality, refers to a program's tendency to reuse, in the near future, instructions and data that are currently in use. Spatial locality implies that portions of the address space of the CPU near those that are currently in use have a high likelihood of being used again. Information transfer between main memory and cache is done using fixed size units called lines (or blocks). Caches typically exploit spatial locality by retrieving a full line upon a cache miss. Temporal locality is exploited by retaining lines containing recently referenced instructions and data. By servicing the majority of the memory references generated by the CPU (cache hits), caches can substantially reduce program execution times. Memory references not contained in the cache cause cache misses. Depending upon the miss penalty, a miss rate of even a few percent can dramatically lower a computer system's performance.

A cache integrated onto the central processing unit may be accessible in a single clock cycle. Computer system speed is highest when needed information is in the cache. Delays occur when a fetch of data or instruction is outside of the cathe and within the external memory. In such a case, the central processor is required to wait a large number of clock cycles for retrieval of the data within the external memory. Thus, processor operating efficiency and speed depends, in part, upon the number of cache hits and cache misses during a given operating sequence.

As the gap between processor speeds and memory access times increases, cache miss penalties become more prominent in determining computer system performance. In a processor system including a given prefetch mechanism, performance therefore suffers whenever the program being executed by the processor system fails to effectively use the cache contents. Prefetching which does not adapt to a given program's memory traversal patterns may impede the ability of the program to make efficient use of the cache.

Frequently, a hierarchy of caches is used in place of a single cache, where the first level cache is made small enough to permit a cache hit to be serviced in a single CPU clock cycle, while second and (any other) higher level caches are organized to maximize hit rates. Unfortunately, many programs generate complex memory address sequences for which such cache organizations may not significantly increase cache hits. One example is a program that sweeps though large data arrays in memory. This causes cache lines to be continuously overlaid with new data, so that temporal locality is not exploited. Another example is an indirect address sequence, such as that generated when processor load instructions traverse a pointer-linked data structure or a sparse matrix. In this case, poor cache performance may be experienced because such memory traversals exhibit insufficient spatial locality. Numerous cache lines are fetched into the cache in which only a single word (the pointer to the next data object) is used. Such address patterns are particularly detrimental to the performance of small on-chip data caches.

Intelligent program and data retrieval management may reduce the delays experienced in the retrieval of data from the external memories of a computer. One method of managing the memory involves speculative prefetching of data from the RAM external memory into the cache. Prefetching refers to the advance loading of data from the RAM external memory into the cache. Practically, a prefetch is a prediction of data from a memory location not yet requested by the processor. Generally, a prefetch is generated based upon actual requests from memory by the processor.

An exemplary prefetching technique is described in U.S. Pat. No. 5,317,718. According to that patent, prefetch addresses are issued when a memory access generates a cache miss. Upon a miss, the requested data is retrieved from the external memory along with consecutive memory locations beginning with the requested location. This technique is effective when the program is accessing consecutive memory locations. However, when that is not the case, prefetching only serves to consume memory bandwidth with data that is unnecessary to the program's operation. Moreover, in many cases a cache miss occurs after a cache hit. A chance for effective prefetching is lost in that situation, if prefetch addresses are only issued after a cache miss.

Expansion of the concept of consecutive location prefetching has led to prefetching according to a given stride or distance away from a previously requested memory location, as in Eickemeyer, U.S. Pat. No. 5,313,634. In such a system, a prefetch address is generated by adding a stride to a previously requested memory address. This is effective when a computer is issuing a linear pattern of addresses which are not consecutive. For instance, if a program is fetching column data from an eight row array stored in external memory in row major order, prefetch addresses may be computed by adding 8 to previously requested memory locations. An example of such an arrangement is disclosed in U.S. Pat. No. 5,367,656. Similarly to the '718 patent, cache misses are important to the prefetching scheme. The '656 patent generates prefetch addresses from linear address patterns detected in previous cache misses.

Another prefetching technique, especially applicable to retrieval of image data, is disclosed in U.S. Pat. No. 5,287, 487. That patent describes a prefetching apparatus which retrieves data for eight pixels surrounding a pixel requested by the processor. Image data frequently includes contiguous line segments. In the case where such contiguous line segments are being retrieved by the processor, this prefetching technique will be effective since the next pixel in a contiguous line segment must be within the surrounding 8 pixels. However, only one of the eight surrounding pixels is likely to be requested by the processor, and 7 unnecessary prefetched pixels are retrieved into the cache. The patent also describes a more generally applicable prefetch mechanism which relies upon adding a determined stride to previously issued memory requests.

Excessive prefetching of unnecessary data into a cache causes cache pollution, and induces additional cache misses that reduce program execution speed. This is especially likely to occur under a prefetch scheme based on linear progressions of address, when such regular arithmetic progressions of memory addresses are not being requested by the processor. Scientific programs or image applications frequently make use of large regular, linear address sequences; these progressions may be speculatively prefetched. More complex and irregular patterns of memory traversal by a processor are unlikely to be predicted by mechanisms relying solely upon arithmetic progressions. Additionally, issuing prefetch addresses only upon a cache miss necessarily requires a cache miss, and the associated execution time penalty, before a prefetch is even attempted.

Many modern programs, such as word processors, compilers, graphical user interfaces, operating systems, and data base retrieval programs, utilize more complex memory access patterns. Such programs make use of indirect memory traversals in addition to linear memory traversals.

In an indirect memory traversal, speculative retrieval of consecutive memory locations, or memory locations a fixed distance away from previously requested memory locations will initiate a cache miss. In an indirect memory traversal, the contents of a memory location, and not the memory location itself, are relevant to generation of a prefetch. Thus, prefetching utilizing the memory address probably serves to insure both a cache miss and the pollution of the cache with unnecessary data.

Pollution of the cache with unnecessary prefetched data may also occur even when a complex, but linear, memory traversal is being executed. In the case where a prefetch address is issued upon a cache miss, the condition for prefetching bears little relation to whether a prefetch will be effective. The same is true in a prefetch scheme without prefetch conditions, e.g. a system which continually issues prefetch addresses after every load instruction. If previously cached data is displaced by unnecessarily prefetched data, then additional cache misses may be experienced as a direct result of prefetching.

In sum, there is a need for a computer processor which conducts efficient prefetching while executing programs making use of complex indirect memory sequences as well as linear address sequences. The processor should issue prefetch addresses at times when a prefetch has a good likelihood of accurate prediction of a future load operand address.

It is therefore an object of the present invention to provide an improved computer processor including a prefetch device which issues prefetch addresses only upon entering an armed state and which may predict linear memory traversals as well as indirect memory traversals.

Another object of the present invention is to provide an improved computer processor including a prefetch device which selectively issues prefetch addresses after entering an armed state induced by a recognized memory traversal pattern in load operand addresses generated by the central processing unit.

Yet another object of the present invention is to provide an improved computer processor including a prefetch device which selectively issues prefetch addresses for linear and indirect memory traversals, and in response to linear and indirect memory traversal patterns in previously generated load operand addresses.

Still another object of the present invention is to provide an improved computer processor having a recurrence recognition unit, which recognizes memory traversal patterns in historical information concerning load instructions, and a prefetch unit that issues prefetch addresses.

A further object of the present invention is to provide an improved computer processor having a recurrence recognition unit including a reference prediction table which stores historical information concerning load instructions and arming and stride information for calculating prefetch addresses, and a recurrence state unit which produces enable signals based upon information within the reference prediction table.

A still further object of the present invention is to provide an improved computer processor having a recurrence recognition unit which monitors load instructions and calculates linear and indirect memory strides based upon the load operand address and load operand date, and a prefetch address generation unit which speculatively calculates prefetch addresses based upon the calculated strides.

An additional object of the present invention is to provide a computer processor having a recurrence recognition unit which monitors load instructions and calculates indirect memory strides using retrieved data from prior load instructions.

SUMMARY OF THE INVENTION

The present invention concerns a computer processor which speculatively issues prefetch addresses for indirect as well as linear memory traversals after entering an armed state. A particular embodiment of the invention includes a central processing unit connected to an external memory through an interface. A cache memory, preferably integrated onto a chip with the central processing unit, is connected to both the central processing unit and the interface. A prefetch device is also preferably integrated onto the chip and selectively issues prefetch addresses after entering an armed state induced by recognized traversal patterns in memory load operand addresses generated by the central processing unit.

The prefetch device may include a recurrence recognition unit and a prefetch unit. The recurrence recognition unit includes a reference prediction table which stores information related to previous executions of load instructions. The information may include instruction and prior operand addresses from load instructions, prior operand data retrieved in accordance with such load instructions, calculated linear stride information, calculated indirect stride information, calculated linear armed information, and indirect armed information. When either the linear or indirect armed states are entered, the prefetch unit will issue prefetch address according to the linear or indirect stride. Linear memory traversals may be predicted according to the linear stride, while indirect memory traversals may be predicted by the indirect stride. Prefetch addresses are issued in response to the armed states providing a good likelihood of accurate load operand address prediction when the processor is executing a given software application. A high cache hit rate may therefore be obtained.

BRIEF DESCRIPTION OF THE DRAWINGS

Other features, objects and advantages of the present invention will be readily apparent to those skilled in the art with reference to the detailed description and the drawings, of which:

FIG. 1 shows the arrangement of FIG. 1A and FIG. 1B.

FIG. 1A and FIG. 1B are a block diagram of a processor constructed in accordance with the present invention including a recurrence recognition unit and a prefetch unit integrated on chip with a CPU:

FIG. 3 is a state diagram for the recurrence recognition unit of FIG. 1 tracking states initiated by the recurrence recognition unit state machine;

FIG. 4 shows the arrangement of FIG. 4A and FIG. 4B.

FIG. 4A and FIG. 4B are a flowchart illustrating operations of the prefetch address generation unit; and FIG. 5 shows the arrangement of FIG. 5A and FIG. 5B.

DETAILED DESCRIPTION OF THE INVENTION

According to the present invention, a processor including a recurrence recognition unit and a prefetch unit selectively issues prefetch addresses. Prefetch addresses are issued when the recurrence recognition unit recognizes memory address patterns in load instructions generated by a central processing unit. When such memory traversal patterns are recognized, the recurrence recognition unit sets either a linear armed state, or an indirect armed state. In response to the armed state the prefetch unit issues a prefetch loading utilizing either an indirect or linear stride calculated from information collected in prior executions of load instructions.

Figure 1B:
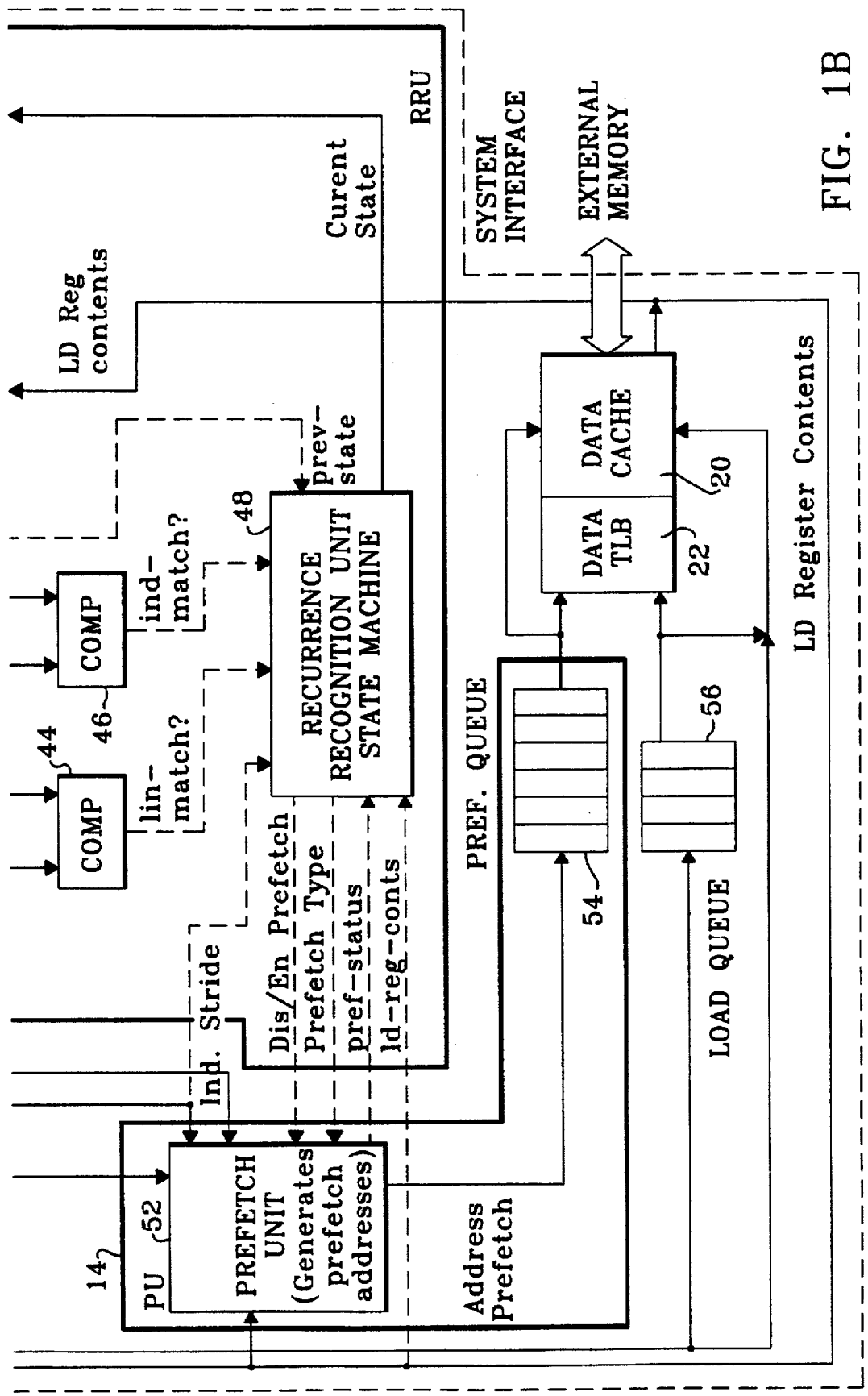

A specific embodiment of the invention will now be described with reference to FIG. 1, which shows a processor 10 constructed in accordance with the present invention. To facilitate explanation of the principles of the present invention, a number of conventions have been adhered to in the illustrated embodiment. The illustrated embodiment assumes that the processor generates a single data memory reference per clock cycle. Processors such as the PowerPC 604 and the MIPS R4000 fall into this category. However, in processors generating more than one data cache memory reference per clock cycle, standard dual porting techniques applied to the data cache and translation lookaside buffer designs may also be applied to the present invention. Among the modern processors falling into this category are the Intel Pentium, the IBM Power2, the DEC Alpha 21164, and the SGI TFP. The processor 10 of the illustrated embodiment also assumes a separate data cache, but inclusion of a unified data and instruction cache should not impair prefetch effectiveness. To further simplify the processor illustration. 10, no conventional design details corresponding to memory store instructions are shown. Finally, the processor 10 of the illustrated embodiment assumes that a word on which the processor experiences a cache miss is returned first, i.e. a wrap-around fill is conducted when cache lines are loaded from external memory.

The processor 10 in accordance with the present invention includes a recurrence recognition unit 12 and a prefetch unit 14 connected to the load/store unit 18 of a central processing unit (CPU) 16. Load instructions and operand data are passed between the rest of the CPU 16 and a system interface via CPU load/store unit 18. Access to a conventional external memory, is through the system interface. Portions of the processor 10 other than those related to the recurrence recognition unit 12 and prefetch unit 14 may take the form of any known or yet to be produced processor.

Operation of the prefetch mechanism of the processor is initiated by the issuance of a load instruction from the processor 16. If the load instruction generated by the CPU 16 addresses data within a data cache 20 through use of a virtual to physical address translation lookaside buffer 22, the data may be returned via a CPU bus, without accessing external memory. Such an access may be completed in a conventional processor within a single CPU clock cycle. In the case where data outside of the data cache 20 is addressed, the CPU 16 must wait for data to be retrieved from the external memory via the system interface and a substantial miss penalty is incurred.

To reduce likelihood of incurrence of such cache misses, selective prefetching is carried out through the recurrence recognition unit 12 and the prefetch unit 14. Prefetching makes use of historical data associated with CPU load instructions and information calculated from the historical data.

Data concerning CPU load instructions is obtained by the recurrence recognition unit 12 and cataloged within a reference prediction table 24. The reference prediction table 24 may comprise a number of fields. As shown in FIG. 1, the reference prediction table includes the following fields: load instruction address 26, previous load operand address 28, previous load contents 30, previous linear stride 32, previous indirect stride register 34 and previous armed state register 36. A row 38 across the various fields corresponds to a single entry in the reference prediction table 24.

Use of the information in the reference prediction table 24 allows the recurrence recognition unit 12 to recognize patterns in load operand addresses that result from the execution of load instructions from the CPU 16. Each of the rows 38 of the reference prediction table 24 is indexed by load instruction addresses stored in the load instruction address field 26. This indexing is chosen since each load instruction address is unique, and thus allows rapid retrieval of information from the reference prediction table 24. Operand data retrieved as a result of the last execution of a load instruction with its instruction address stored in field 26 is stored within the previous load contents register 30. The remaining fields are calculated from the field contents of registers 26, 28 and 30.

If each row 38 is viewed as containing information at a given prior instant $t_{k-1}$ during execution of a given load instruction in a program by the CPU 16, calculations for the linear and indirect strides stored in the linear stride field 32 and the indirect stride field 34 may be expressed as first order recurrences. Specifically, the load instructions in a program image may be indexed by expressions $LD_0$, $LD_1$, $LD_2$, etc. and stored in the load instruction address field 26 of various rows 38 of the reference prediction table 24. Where a load instruction, whose memory accesses are being tracked in the recurrence recognition unit 12 is $LD_i$, the operand address stored within field 28 of the corresponding row 38 and generated due to execution of $LD_i$ may be labelled as $A_{i0}$, $A_{i1}$, $A_{i2}$, etc.

A load operand address generated by the CPU 16 at instant $t_k$ through load unit 18 is directed normally to the cache 20 and the lookaside buffer 22, but is also fed into adders 40 and 42. Adders 40 and 42 also respectively receive the operand address and operand data corresponding to an immediately previous execution of the load instruction $LD_i$ from fields 28 and 30. Output of the adder 40 is a linear stride obtained by subtracting the previous operand address issued for the instruction $LD_i$ from the current operand address. The linear stride may be expressed, therefore, by the following equation:

$$\alpha i_k = Ai_k - Ai_{k-1}$$

Similarly, output of the adder 42 is an indirect stride obtained by subtracting the previous data contents returned from memory for the load $LD_i$ from the current operand address. The indirect stride may be expressed, therefore, by the following equation in which $mem[Ai_{k-1}]$ refers to the contents of the memory location addressed by $Ai_{k-1}$:

$$\beta i_k = Ai_k - mem[Ai_{k-1}]$$

The linear stride and indirect stride are then respectively compared to a previous indirect and linear stride in comparators 44 and 46. A state machine 48 monitors outputs of the comparators 44 and 46 to determine if the linear or indirect stride has become stable. Stability of either stride is then used to arm the prefetch unit 14 and enable the issue of prefetch addresses.

An arbitrary stability number n may be used by the state machine 48. The number n will correspond to the number of successive address computations for which one of the strides has become time invariant to produce an armed state. The particular choice of number n will affect how soon an armed state is entered after one of the strides stabilizes. Preferably, the number n should be set to at least 2, since a setting of 1 is unlikely to indicate any pattern in a memory traversal. Raising the number n may further insure that a memory traversal pattern has been detected and further reduce the likelihood of an incorrect prediction. However, raising the number also suppresses issuance of early prefetch address in a memory traversal pattern. Some miss penalties are associated with either condition. Modification of the number n will predictably shift penalties associated with either condition.

In the case where n is set to two, the state machine 48 determines if either or both of the address strides has become equal for at least two consecutive computations. This condition may be described generally by the following equations:

(1) $\alpha i_k = \alpha i_{k-1} = \alpha i_k = \alpha i$ (for the linear stride), and (2) $\beta i_{k-1} = \beta i_{k-1} = \beta i_k = \beta i$ (for the indirect stride).

Where equation (1) becomes true for any two consecutive computations, the state machine 48 outputs a linear armed current state. When equation (2) becomes true for any two consecutive computations, the state machine 48 outputs an indirect armed current state. If neither equation is true then the state machine 48 outputs an unarmed current state.

The current state, linear and indirect strides, load operand address, and load operand data, are stored in an update buffer 50. The contents of the buffer 50 are used to update the reference prediction table 24 when the next operand address is generated pursuant to a CPU memory load instruction.

The reference prediction table 24 is organized like a cache. In the ideal case, the number of entries in this table should be sufficient to contain entries 38 for all load instructions in a given program image. Such a table would be impractical to integrate on a CPU chip 10 due to die size constraints, since large program images can contain thousands of load instructions. On the other hand, a reference prediction table 24 with a only single entry 38 can be beneficial if that entry is for an armed load instruction. The table 24 should be made large enough to contain entries for tracking the memory traversal patterns for the subset of load instructions that are active at any point during a given program's execution. If the reference prediction table 24 is full, a row entry 38 associated with an instruction will have to be displaced. If the table 24 is organized like an associative cache the first preference for displacement is an unarmed load instruction. However, if all instructions are armed in the reference prediction table, then the least recently used armed load instruction is displaced. No such choice need be made if the table 24 is direct mapped.

Either of the armed current states will also result in the issuance of a prefetch enable signal to the prefetch unit 14. Additionally, the type of armed state will be identified, linear or indirect. A prefetch address generation unit 52 within the prefetch unit 14 will generate and issue prefetch addresses only when enabled for either the linear or indirect armed state. Prefetch address generation in the linear armed state is accomplished through addition of the current operand address to the linear stride, expressed as:

$Ai_{k+1} = Ai_k + \alpha i$

When armed for indirect prefetch, the address generation unit 52 generates prefetch addresses through addition of the indirect stride to the memory contents returned for the executed operand address, expressed as:

$Ai_{k+1} = mem[Ai_k] + B_i$

The prefetch address generation unit 52 will continue to generate and issue prefetch addresses according to those expressions as long as the appropriate armed enable signal is detected. The prefetch addresses are queued through a prefetch unit queue 54 in a conventional manner similar to that of a standard CPU load queue 56. Prefetch data received in response to a prefetch address are stored within the data cache 20. Alternate embodiments may choose to first store the prefetched data in a separate on-chip buffer, and then transfer it to cache when a load instruction actually references it. When an unarmed state is entered, the state machine 48 will disable the prefetch unit 14 until another armed state is entered.

Considering a single row 38 in the reference prediction table, the initial filling of the row for a single load instruction $LD_i$ will require at least three executions of the instruction. Both the linear stride and the indirect stride require at least one previous execution. The armed state, when n is set to 2, requires at least two previous executions. Thus, the armed state is not determinable until at least three executions of the load instruction have occurred.

Figure 2A:
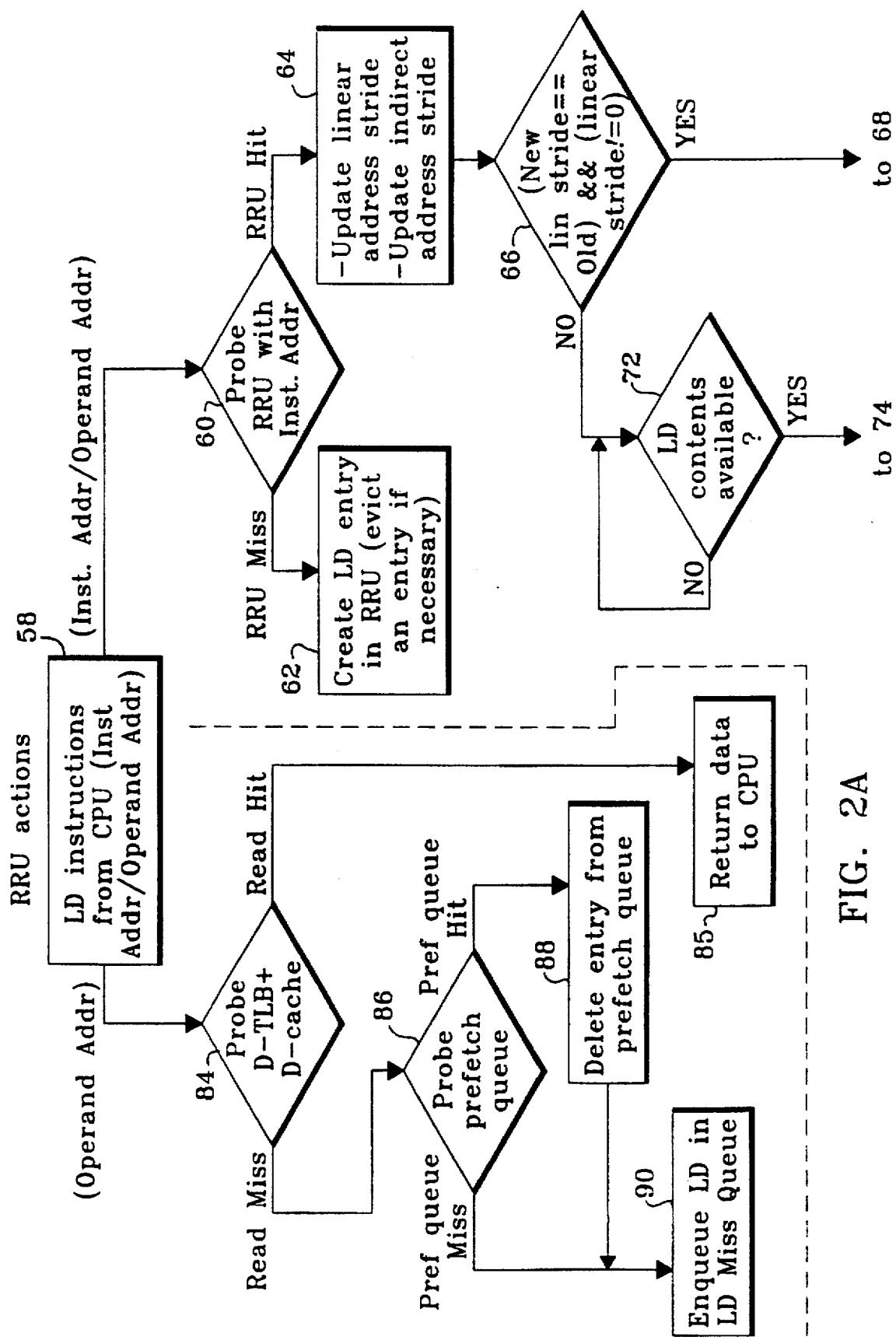
FIG. 2A and FIG. 2B are a flowchart illustrating operations of the recurrence recognition unit of FIG. 1.
Figures 2, 2B:
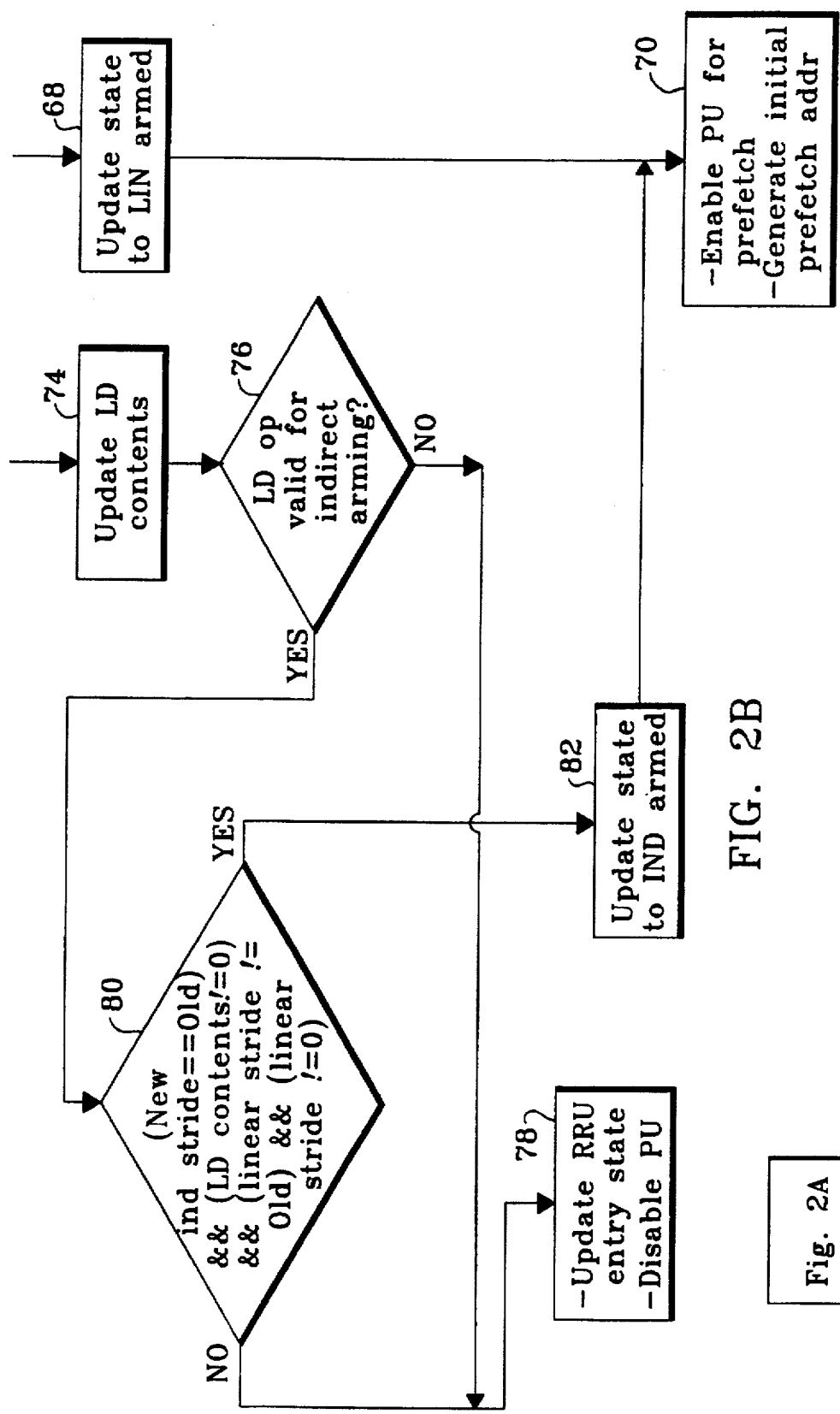
FIG. 2 shows the arrangement of FIG. 2A and FIG. 2B.

Referring now to FIG. 2, the specific operations of the recurrence recognition unit 12 in parallel with a CPU pipeline fetch are illustrated in flowchart form. Reception of a load instruction address and an operand address from the CPU load unit 18 in step 58 triggers parallel RRU actions, shown to the right of dotted line, and normal CPU data fetch actions shown to the left.

Considering the recurrence recognition unit actions first, an initial step 60 determines whether or not an entry already exists in the reference prediction table 24 for the load. A miss requires that an entry be created in step 62. The creation of the entry is carried out as discussed above with reference to FIG. 1, using the adders 40 and 42, comparators 44 and 46, state machine 48 and update buffer 50.

In the case where the load instruction address is already resident in the reference prediction table 24, updating of the linear and indirect strides is conducted in step 64. The manner of updating uses the same information as for the creation of stride information for a new entry; namely, the information present at the outputs of adders 40 and 42. In step 66, the comparator 44 determines whether or not the current linear stride from the adder 40 matches the immediately previous linear stride and the state machine determines if the match extends to the previous calculation by the comparator. If that is the case, then, in step 68, the linear stride has become or remained time invariant for two consecutive executions and the state machine 48 will update the state of the load instruction address to armed, through the buffer 50. Additionally, in step 70, which actually may occur at the same time as step 68, the state machine 48 outputs a prefetch enable and linear prefetch signal to the prefetch unit in step 70.

Preferably, the linear stride path is first checked in step 66 because issuing a prefetch address using the linear stride does not require a wait for return of load operand or prefetch data. There may be cases where both the linear and indirect armed states are valid, and step 66 preferably places the recurrence recognition unit 12 into a linear prefetching enable state. Since there is no need to wait for the return of memory contents for linear stride prefetching, multiple prefetch addresses may be calculated. However, if a particular processor 10 were to be utilized primarily with pointer intensive programs that generate a much larger number of indirect address sequences, then the indirect state might be preferred in step 66. The resulting modification would send the recurrence recognition unit down the indirect armed state path whenever both the indirect and linear state were valid.

According to the illustrated embodiment, the indirect path is entered when the linear stride was not stable for two consecutive fetches at step 66. The recurrence recognition unit waits for return of memory contents in step 72, and when received, updates the field 30 for the indexed load instruction in step 74. Byte and half-word loads are prohibited, in step 76, from participating in indirect address sequences because their contents cannot be used to compose meaningful operand addresses. Receipt of this information allows adder 42 to calculate the indirect stride. If the comparator 46 finds no match to the immediately previous stride, then the state machine 48 updates field 36 for the indexed load instruction to unarmed state and the prefetch unit 14 is disabled in step 78.

When the comparator 46 finds a match of indirect strides, the stability of the stride with an immediate previous stride is checked in step 80 by the state machine 48. A negative determination updates the state to unarmed and disables the prefetch unit 14 in step 78. An affirmative determination updates the state to indirect armed (step 82) and the prefetch unit 14 is enabled to prefetch according to the indirect stride in step 70.

In parallel with the recurrence recognition unit 12 actions, a slightly modified conventional sequence for memory fetch is carried out in the CPU—memory interface pipeline. Using the operand address from the load instruction unit 18, the translation lookaside buffer 22 and data cache 20 are searched to see if the requested operand data is in the data cache 20 in step 84. When there is a cache hit, the requested data can be immediately returned to the CPU 16 (step 85). A cache miss requires a probe of the prefetch queue 54 to see if a prefetch address has already been issued for the same operand address, but the contents have not yet been returned to the data cache 20 (step 86).

A search of the prefetch queue for an operand address matching the instruction issued by the CPU 16 may result in a miss. A miss indicates that either prefetch addresses were not issued due to an unarmed state of the recurrence recognition unit 12, or that issued prefetch addresses failed to accurately predict the CPU load operand address instruction. The latter situation indicates the end of an indirect or linear pattern memory traversal by the CPU 16.

When step 86 results in a hit, there has been a successful prediction of the load operand address by the prefetch unit 14 and the recurrence recognition unit 12. However, the residence of the prefetch address in the prefetch queue indicates that it has not yet been completed. To avoid duplication of memory requests, the prefetch queue entry is deleted (step 88) and the load instruction is enqueued in the load queue 56 from which the external memory fetch will be issued through the system interface (step 90). If the load queue 56 is full as a result of a backup of external memory requests, then the CPU 16 stalls, i.e. stops executing new instructions, while waiting to enqueue the load instruction.

Importantly, the recurrence recognition unit 12 may enable prefetching in step 70 for either a linear or indirect address sequence without waiting for a cache miss. This will result in performance improvement when a pattern of CPU load instructions resulting in cache hits is indicative of a future cache miss. Recognizing a memory traversal pattern through the monitoring of the linear and indirect strides saves a transition inherently including a cache miss, as is present in prefetching mechanisms triggered by a cache miss.

Unnecessary cache pollution is also avoided. The separation of the prefetch unit 14 from the pattern recognition of the recurrence recognition unit allows disabling of the prefetch unit in accordance with the unarmed state. Thus, when neither of the strides become stable, no prefetch addresses are used. Instead, a memory traversal pattern is waited for, as indicated by the stabilization of one of the strides and prefetch issue is suppressed until such event occurs. In contrast, a continually active prefetch mechanism will frequently displace data from the data cache 20 even though the likelihood of a successful prefetch prediction has not been evaluated through analysis of CPU memory traversal patterns.

The state transitions allowing arming without a cache miss, transition between armed linear and armed indirect states, and waiting unarmed for recognition of a memory traversal pattern, are illustrated in FIG. 3. The state diagram of FIG. 3 tracks the state transitions initiated by the state machine 48.

A transition from the unarmed state S0 to the armed linear state S1 occurs whenever the linear stride becomes stable, as tracked by arrow 1, when two consecutive linear stride matches are output from the comparator 44. As discussed above, this transition will be made even if the indirect stride becomes simultaneously stable, since the branch in step 66 occurs first on the linear stride. This may be modified to favor the indirect stride in a given embodiment.

As long as the linear stride remains stable the linear armed state S1 will be maintained as tracked by arrow 2. Destabilization of the linear stride in the armed state, as indicated by a lack of two consecutive equal strides from output of comparator 44, will cause a return to unarmed state S0, tracked by arrow 3. However, a transition to the armed indirect state S2 (arrow 7) will be made if the indirect stride has stabilized (at output of comparator 46) just as the direct stride becomes unstable. As the linear stride is favored, transition from indirect armed S2 to linear armed S1 (arrow 8) will be made whenever the linear stride becomes stable and irrespective of the continued stability of the indirect stride. Where the indirect stride becomes unstable and the linear has not become stable, a return to the unarmed state S0 is made from the indirect armed state S2 (arrow 6). Transition from unarmed state S0 to armed state S2 (arrow 5) is made when the indirect stride becomes stable and the linear stride has not become stable. Finally, the state machine 48 remains in unarmed state S0 (arrow 9) when neither of the linear or indirect strides have become stable.

Figure 4B:
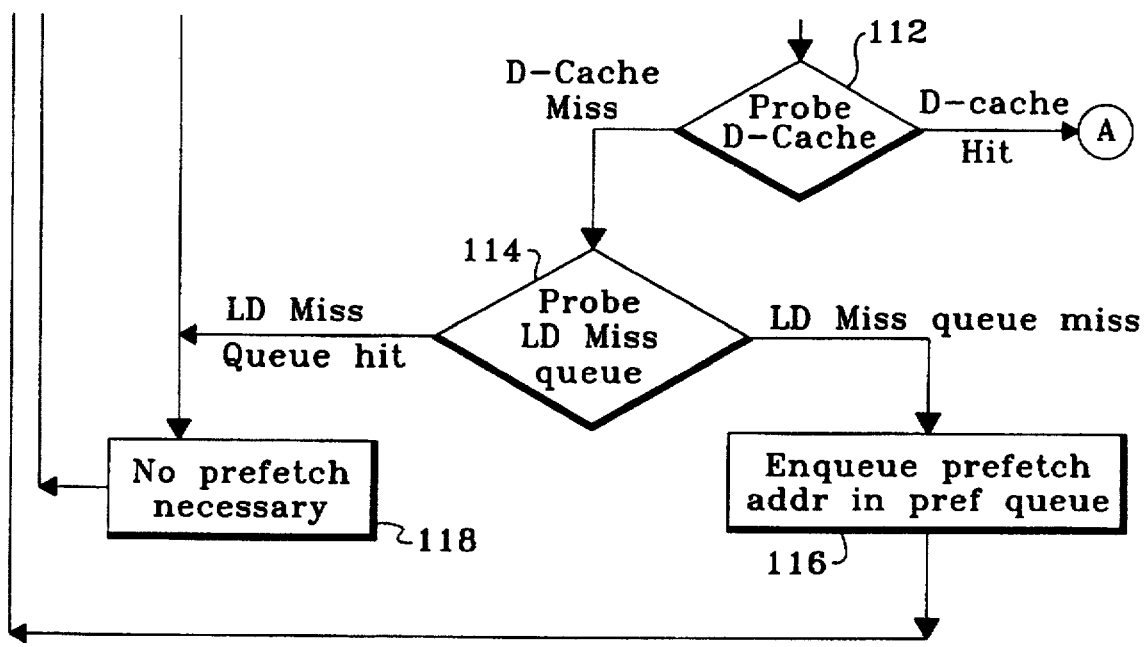

In accordance with the unarmed and armed states, enable and disable signals are sent to the prefetch unit 14. The corresponding actions of the prefetch address generation unit 52 are illustrated in the flowchart of FIG. 4. The prefetch unit 14 defaults to a disabled state 92 and waits for an enable signal and a stride type signal from the state machine 48. When enabled, the prefetch address generation unit updates the initial operand address (step 94) to be used in either the indirect or linear prefetch address calculation. If a disable is received during or after updating of the operand address, prefetch address generation is halted (step 98), and the prefetch unit 14 returns to step 92. A continued enable requires a check of the type of enable, linear or indirect (step 100). If linear, then the new prefetch address may be immediately calculated (step 102). If indirect, then a wait for return of previous load memory contents (step 104) must be conducted before calculation of a new prefetch (step 106). In step 108 the prefetch address is updated with the address computed according to either the linear or indirect stride and a probe of the translation look aside buffer 22 is made (step 110). If a translation lookaside buffer miss is experienced, no prefetch address is issued to avoid inducing a page fault (step 118), and the PU 14 control returns to step 92. If, on the other hand, the translation lookaside buffer probe is successful, the data cache is probed next in step 112. In case of a data cache hit, no prefetch address issue is necessary (step 118), and control returns once again to step 92. If a miss is experienced in the probe of the data cache (step 112), the load miss queue is probed in step 114. If this probe results in a hit, no prefetch address issue necessary (step 118). If the load queue probe is unsuccessful in step 114, the prefetch address is enqueued in the prefetch queue 54 (step 116). Thereafter, control is transferred to step 96 where the prefetch enable signal from the RRU 24 is examined.

Figure 5A:
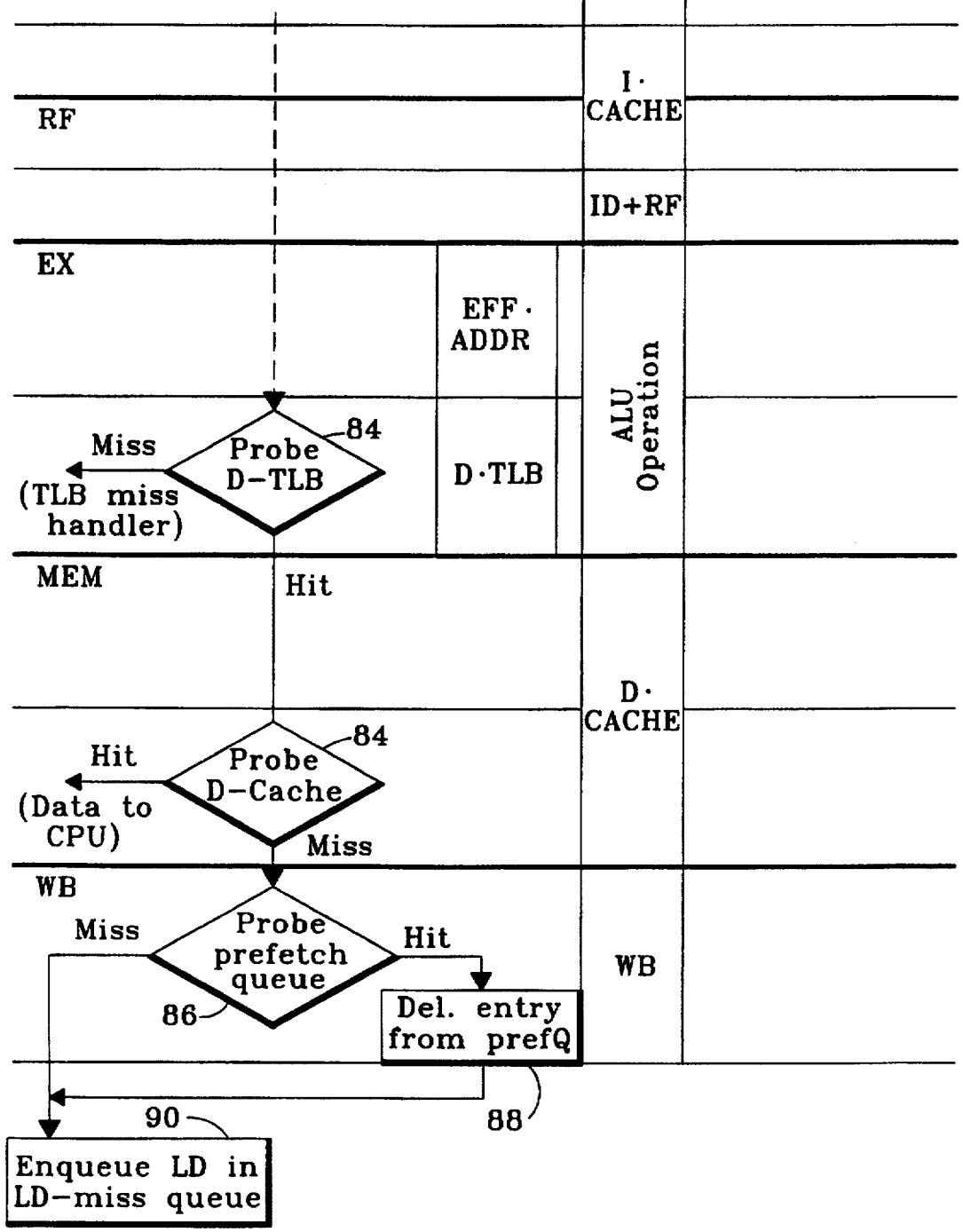
FIG. 5A and FIG. 5B are a diagram mapping the recurrence recognition unit functions onto a conventional five stage CPU pipeline.
Figure 5B:
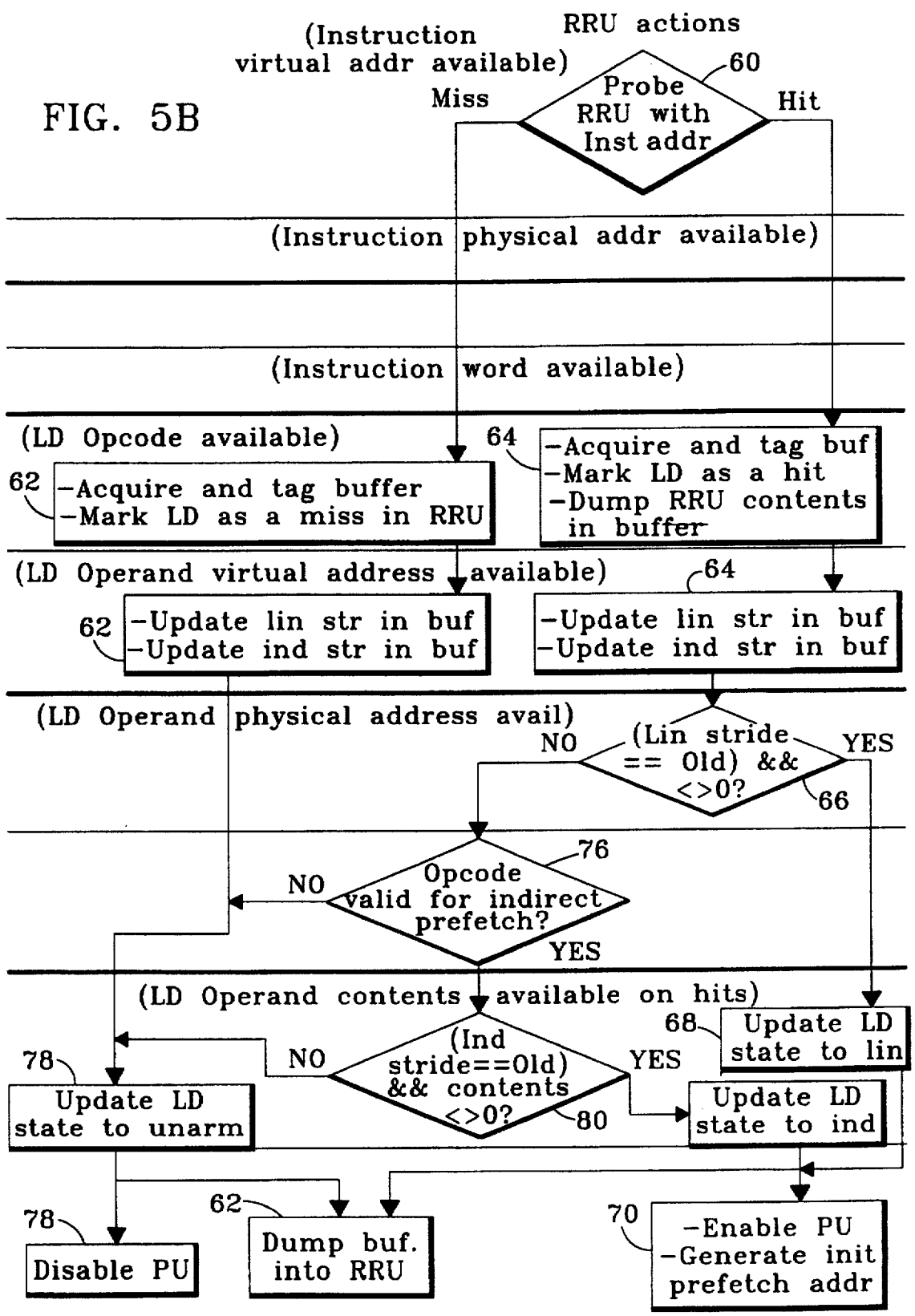

Having discussed the general structure and operation of a recurrence recognition unit 12 and prefetch unit 14, the incorporation of the present invention into a conventional five stage CPU pipeline is illustrated in FIG. 5. A modern CPU might use such a pipeline for an individual function unit 18, such as a load store unit. In that case, the recurrence recognition unit 12 and prefetch unit 14 could be incorporated into the load store unit.

The pipeline of FIG. 5 includes five major stages: instruction fetch (IF), register file read and instruction decode (RF), instruction execution or effective address calculation (EX), memory access (MEM) and register file write back (WR). Each stage is divided into two phases. The instruction translation lookaside buffer is probed in the first phase of the IF stage. The instruction cache is probed in the second phase of the IF stage and the first phase of the RF stage. The second phase of the RF stage is used for decoding the instruction and reading the register file. In the two phases of the EX stage, either an ALU operation is completed, or in the case of a memory access instruction, the effective address is computed in the first phase and the data translation lookaside buffer probed in the second phase. For memory access instructions, the data cache is probed in the two phases of the MEM stage. Finally, the register file is written in the first phase of the WB stage. The functions of the recurrence recognition unit 12 are overlaid onto the pipeline map using the same reference numbers as the FIG. 2 flowchart. The operations of the prefetch unit 14 need not be placed into the pipeline map since the prefetch unit 14 operates asynchronously in response to the enable signal from the state machine 48. It should be noted that the dumping of the update buffer 50 into the reference prediction table is part of the step 62, but in the pipeline structure is delayed until the WB stage.

Exemplary patterns detectable according to the present invention are illustrated below in C language syntax. A typical program code fragment that performs a reduction on array a may be represented as follows:

```
int i, m;
int a[100];
...
for (i=0; i<100; i++) {       /* A */
    m = m +a[i];
...
}
```

The ellipses represent code superfluous to the reduction that has been edited. In loop A, every element of the array a is added to m. When executing, loop A will generate the memory addresses (ignoring the scalars i and m, and instruction addresses)

a, a+4, a+8, a+12, a+16, a+20, a+24, ...

and so on. This loop is common of code found in dense numeric programs. This sequence of addresses can be described by the first order linear recurrence $a_k = a_{k-1} + 4, k \in \{1,2,3, \ldots\}$ This represents the linear address sequence and when detected the linear armed state will be entered according to the present invention.

Next, consider a reduction on elements of a singly-linked list which may be represented as follows:

```
int  n;
struct b { int x; double z; struct b *y; };
struct b *p, *q;
...
/* Construct list with SIZE elts */
q = build_list (SIZE);
...
/*Traverse it */
for (p=q; p!=NULL; p=p->y) {     /* B */
    n = n +p->x;
...
}
```

This loop, when executed, will generate the memory addresses (ignoring the scalar n, and instruction addresses)

*q, *q+12, *(*q+12), *(*q+12)+12, *(*(*q+12)+12),

*(*(*q+12)+12)+12, ...

every x field in the linked list pointed to by q is added to n. The memory behavior of loop B is typical of irregular symbolic computations. Note that in the above sequence, *(*q+12) represents a single address, given in terms of the initial value of the variable q, and not an expression evaluation that involves two memory references and an addition. Every alternate access in the above sequence (starting with the second one)

*q+12, *(*q+12)+12, *(*(*q+12)+12)+12, ...

which corresponds to updates of the pointer variable p, can be described by a first order recurrence, given by $p_k = Mem[p_{k-1}] + 12, k \in \{1,2,3, \ldots\}$ This is an indirect address sequence which may be predicted according to the indirect stride. Here, Mem $[p_{k-1}]$ refers to the contents of the memory location pointed to by p, i.e. *p. The index variable k is used to denote successive values of p.

Consider another reduction, this time on a sparse vector, c, and its associated index array, d. If the representation used is one that simulates linked lists using arrays, the code might be as follows:

```
int i, x;
int c[N], d[N]; /*c is sparse, d is c's index array */
...
i + index_of_head_of_list;
while (i) {      /* C*/
    x = x + c[i];
    i = d[i]; /* update pointer */
...
}
```

When executing, loop C will issue the memory addresses (ignoring the scalars i and x, and instruction addresses)

c+4.i, (d+4.i), c+4.(*(d+4.i)), (d+4.(*(d+4.I))), ...

and so on. This loop is representative of code found in some sparse numeric programs. As in the linked-list example, note that c+4.(*(d+4i)) represents a single address, given in term of the starting address of the array c and array elements d[i]. The addresses for accessing elements of d also describe a first order linear recurrence (d+4.i), (d+4.(*(d+4.i))), (d+4.(*(d+4.i)))), ...

This recurrence can be expressed by the equation $$d_k = 4 \times Mem[d_{k-1}] + Base(d), k \in \{2,3,4, \ldots\}$$

where Base(d) is the base address in memory of index array d. $d_1$ is set before loop C is entered. Notice that this is an indirect address sequence similar to the above recurrence, with the only difference being in the component that varies. Here, the base address of array d is fixed, and accessing is of elements of d randomly. In the linked-list traversal, the base address of each object retrieved from memory varies; however, the offset within each object where the pointer to the next object is to be found, is fixed and predicted according to the indirect stride.

While a particular embodiment of the present invention has been described, it will be appreciated by those skilled in the art that changes and modifications may be made thereto without departing from the invention in its broader aspects and as set forth in the following claims. The general principles of the recurrence recognition unit and the prefetch unit may be appropriately adapted to many different microprocessor arrangements without departing from the scope of the present invention.

What is claimed is:

1. A computer processor comprising:

a central processing unit;

an interface for coupling said central processing unit with an external memory device;

a cache memory coupled with said interface and said central processing unit; and prefetch means for selectively issuing one of linear and indirect prefetch addresses for prefetching data from said external memory device to be loaded into said cache memory through said interface, said prefetch means respectively issuing one of said linear and indirect prefetch addresses after entering one of a linear and indirect armed state respectively induced by a recognized one of a linear and indirect memory traversal pattern in load operand addresses from said central processing unit, wherein said linear armed state is entered in response to at least two consecutive equal linear strides in load operand addresses, wherein the linear stride is $\alpha i_k = Ai_k - Ai_{k-1}$, and said linear prefetch addresses are computed using the linear stride according to $Ai_{k+1} = Ai_k + \alpha i_k$, where a current load operand address is $Ai_k$, a last prior load operand address is $Ai_{k-1}$, and a next prefetch address is $Ai_{k+1}$, and wherein said indirect armed state is entered in response to at least two consecutive equal indirect strides, wherein the indirect stride is $\beta i_k = Ai_k - \text{mem}(Ai_{k-1})$, and said indirect prefetch addresses are computed using the indirect stride according to $Ai_{k+1} = \text{mem}(Ai_k) + \beta i_k$, where $\text{mem}(Ai_k)$ and $\text{mem}(Ai_{k-1})$ are contents of the respective memory locations addressed by $Ai_k$ and $Ai_{k-1}$.

2. A computer processor according to claim 1, wherein said prefetch means comprises:

a recurrence recognition unit, said recurrence recognition unit recognizing said linear and indirect memory traversal patterns in load operand addresses from said central processing unit using said linear and indirect strides and producing a signal indicating when one of said linear and indirect armed state has been entered; and a prefetch unit, said prefetch unit generating prefetch requests from said external memory device using one of said linear and indirect strides in response to said signal received from said recurrence recognition unit.

3. A computer processor according to claim 2, wherein said recurrence recognition unit comprises:

a reference prediction table, said reference prediction table storing, load instruction addresses for a current central processing unit load instruction, load operand addresses corresponding to said load instruction addresses, and operand data from said external memory device corresponding to said load operand addresses.

4. A computer processor comprising:

a central processing unit, said central processing unit executing load instructions for loading of data from an external memory device;

interface means for coupling said central processing unit with the external memory device;

a cache memory coupled with said interface and said central processing unit, said cache memory having an access time which is less than an access time for the external memory device;

recurrence recognition means for monitoring said load instructions and calculating linear and indirect memory strides based upon consecutive executions of said load instructions from said central processing unit, said recurrence recognition means producing an enable signal indicating one of a linear and indirect armed state upon recognition of one of a respectively recurring linear and indirect load operand address memory traversal pattern, wherein said linear armed state is entered in response to at least two consecutive equal linear strides in load operand addresses, and said linear stride is $\alpha i_k = Ai_k - Ai_{k-1}$, where a current load operand address is $Ai_k$, a last prior load operand address is $Ai_{k-1}$, and said indirect armed state is entered in response to at least two consecutive equal indirect strides, and the indirect stride is $\beta i_k = Ai_k - \text{mem}(Ai_{k-1})$, where mem $(Ai_{k-1})$ are the contents of the memory location addressed by $Ai_{k-1}$; and prefetch address generation means for speculatively calculating prefetch addresses for said load instructions based upon one of said linear and indirect strides by using the linear address stride to calculate linear prefetch addresses according to $Ai_{k+1} = Ai_k + \alpha i_k$, where a next prefetch address is $Ai_{k+1}$, and by using the indirect address stride to calculate indirect prefetch addresses according to $Ai_{k+1} = \text{mem}(Ai_k) + \beta i_k$.

5. A computer processor according to claim 4, wherein:

said recurrence recognition means produces, and outputs to said prefetch address generation means, said enable signal indicating one of a linear and indirect armed state, and a disable signal, said disable signal being produced when said enable signal is not produced.

* * * * *

UNITED STATES PATENT AND TRADEMARK OFFICE
CERTIFICATE OF CORRECTION

PATENT NO. : 5,694,568
DATED : December 2, 1997
INVENTOR(S) : Harrison, III et al.

It is certified that error appears in the above-identified patent and that said Letters Patent is hereby corrected as shown below:

Column 2, line 66, delete "wide," and insert --wide-- therefor

Column 3, line 26, delete "cathe" and insert --cache-- therefor

Column 6, line 34, delete "states" and insert --states,-- therefor

Column 9, line 20, delete "$\alpha i_k$" (first occurrence) and insert --$\alpha i_{k-2}$-- therefor Column 9, line 21, delete "$\beta i_{k-1}$" (first occurrence) and insert --$\beta i_{k-2}$-- therefor

UNITED STATES PATENT AND TRADEMARK OFFICE
CERTIFICATE OF CORRECTION

PATENT NO. : 5,694,568
DATED : December 2, 1997
INVENTOR(S) : Harrison, III et al.

It is certified that error appears in the above-identified patent and that said Letters Patent is hereby corrected as shown below:

Column 13, line 10, after "issue" insert --is--

Column 13, line 67, delete "a'8," and insert --a+8.-- therefor

Column 14, line 30, before "every" insert --because--

Column 14, line 67, delete "4.I" and insert --4.i-- therefor

Column 16, line 6, delete "state" and insert --states-- therefor

Signed and Sealed this

Thirteenth Day of October 1998

Attest:

BRUCE LEHMAN

Attesting Officer

Commissioner of Patents and Trademarks